Dec. 5, 1967  A. A. BERNARD ET AL  3,356,274
ELECTRODE FEED APPARATUS
Filed March 15, 1965  2 Sheets-Sheet 1
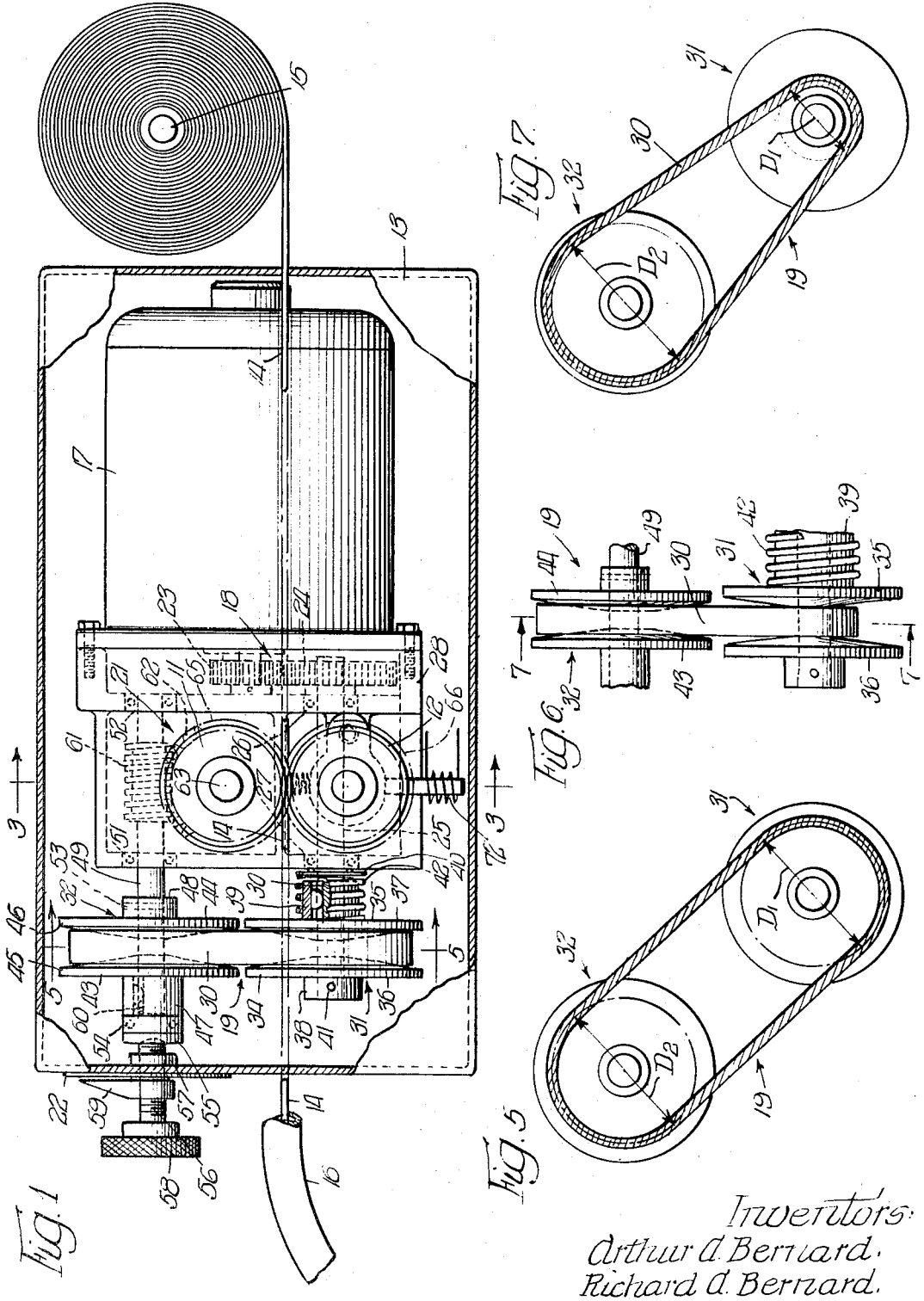
Inventors:
Arthur A. Bernard,
Richard A. Bernard.
By Hume, Groen, Clement & Hume,
Attys

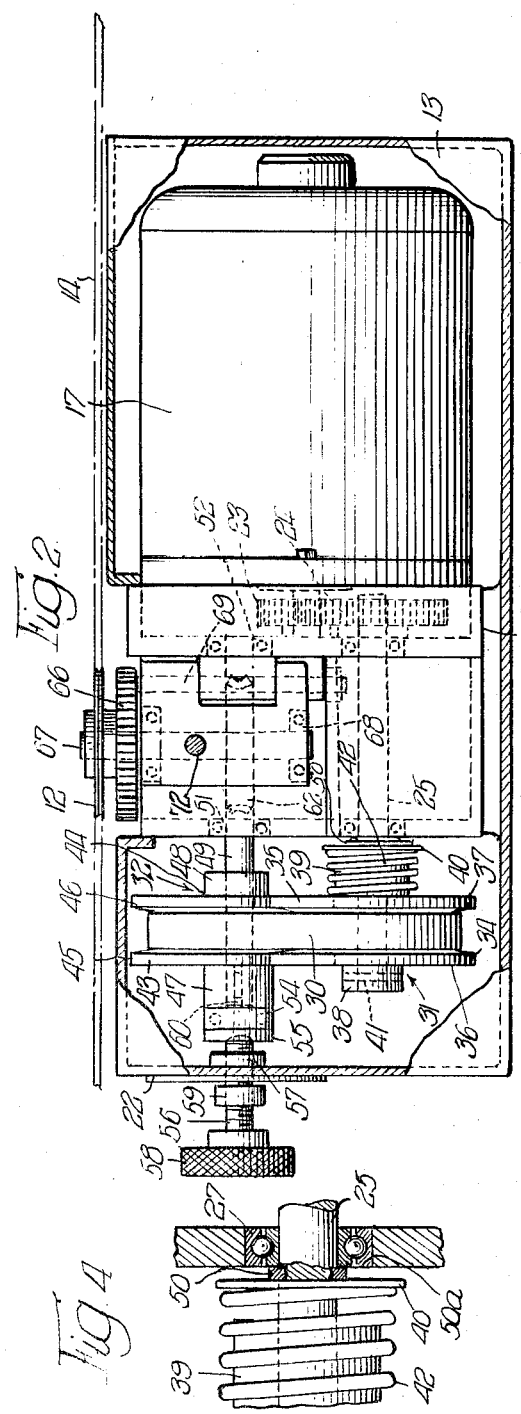

United States Patent Office 3,356,274
Patented Dec. 5, 1967

3,356,274
ELECTRODE FEED APPARATUS
Arthur A. Bernard and Richard A. Bernard, Chicago Heights, Ill., assignors to Bernard Welding Equipment Company, Beecher, Ill., a corporation of Illinois
Filed Mar. 15, 1965, Ser. No. 439,763
10 Claims. (Cl. 226—178)

This invention relates to electrode feeding machines for automatic arc welding of the continuous-feed type in which consumable wire electrode is withdrawn from a source and pushed through a conduit to the welding arc by one or more power-driven pairs of traction feed rolls. More particularly, this invention relates to a method for providing variable-rate electrode feed and to apparatus for implementing this method.

To be suitable for welding all types and thicknesses of metal, electrode feed apparatus must be capable of feeding all of the different sizes of wire electrode in general use, which range in size from $\frac{1}{32}$ inch diameter to $\frac{3}{16}$ inch diameter. In addition, the electrode feed apparatus should permit adjustment of the rate of electrode feed over a wide range which, to adequately accommodate all requirements, should at least comprise a stepless range of from 75 to 450 inches of electrode per minute.

Referring to electrode feeding machines now in general use, of which there are no less than a dozen different makes, the construction of all of them is basically the same. All contain a lubricant-tight base housing which acts as a supporting base for the attachment of the other components which make up the machine as a whole. A variable-speed motor used to supply the power for feeding the electrode is rigidly attached to the base housing. The base housing contains a train of gears in the form of spur gears, worm gears or both, mounted on two or more shafts for the purpose of reducing the r.p.m. of the variable-speed electric feed motor down to the required speed at which the electrode feed rolls rotate for feeding electrode to the welding arc. The electrode feed rolls in all cases are mounted outside of the base housing and are powered by a shaft which extends out through one of the walls of the base housing. The electrode feed rate is adjusted by changing the speed of the variable-speed electric motor which powers the traction feed rolls. This is accomplished either by adjustment of an electrical governor or by varying the amount of electrical current supplied to the variable-speed motor. However, the reliance upon variable-speed drive motors carries with it several marked disadvantages in addition to the expense of the variable-speed motor itself. It will aid in understanding the objects of this invention to briefly consider several significant disadvantages which attend the present variable-speed drives.

The use of an electrical governor, for example, is attended by continuing fluctuations in the electrode feed rate since the governors are of the type wherein centrifugal force compresses an adjustable spring to open the contacts of a switch and cut off current supply to the motor when the motor speed reaches a selected level. The adjustable spring is released and current is again supplied to the motor when the motor speed drops below a selected level. Hence, while this form of regulation provides an average speed which can be varied by adjustment of the governor, the instantaneous rotational speed of the variable-speed motor is continually fluctuating by some finite amount, a condition which results in a corresponding fluctuation in the electrode feed rate and consequent non-uniformity of welding results. A further disadvantage of the electrical governor is the requirement for frequent replacement of the contact points since the life of the contact points is shortened by arcing due to opening of the switch when the motor is under full load.

Control of the electrode-feed rate by regulation of the amount of current supplied to a variable-speed motor also presents problems. An elaborate and, hence, expensive electronic control system is required in order to effect the desired current regulation. The complexity of this electronic equipment not only tends to raise the frequency of maintenance, but more importantly, renders it generally beyond the ability of the average welding operator or mechanic to service and repair. Further, the electronic control system is frequently housed in a cabinet which is separate from the electrode feed apparatus. The separate cabinet adds bulk which detracts from portability.

Moreover, to provide the required horsepower at the lower speed ranges for pulling tangles out of the coil of wire electrode and for pushing kinked sections of the wire electrode through the conduit to the welding arc, a variable-speed motor must be several times larger in horsepower than the constant-speed motor utilized in the present invention. Hence, variable-speed motors not only reduce portability of the electrode feed apparatus but additionally cost three to four times more than the constant-speed motor utilized in the present invention.

Accordingly, it is a primary object of the present invention to provide a variable rate electrode feed apparatus, which is entirely mechanical in operating principle. This primary object is achieved by improving the construction of conventional electrode feeding machines in the following preferred manner. Two shafts mounted within the base housing and connected to the reduction gearing at their inner ends are extended out of one wall of the base housing for the purpose of interconnecting these two shafts with a pair of variable pitch diameter V-belt pulleys interconnected with a conventional V-belt. In addition, a constant-speed motor is substituted for the variable-speed motor as the prime mover. By varying the pitch diameter relationship of the two variable-pitch V-belt pulleys which form a serial portion of the train of power to the feed rolls, the rotational speed of the feed rolls is varied.

Another equally important object of this invention is low cost to the user and with this present invention this object is accomplished by eliminating the need for the conventional high priced variable-speed electric motor and its high costs and complicated electric governor or electronic control system by the use of one pair of variable-pitch diameter V-belt pulleys, presently costing less than five dollars, and interconnecting these two variable-pitch V-belt pulleys with a V-belt, presently costing less than one dollar.

Another equally important object of the present invention is to provide the welding industry with an electrode feeding machine particularly characterized by simplicity and rugged reliability such that maintenance and repair requirements are minimal and can be carried out by the average welding operator or mechanic. As is generally known, V-belt pulleys practically never wear out; at least they usually last the life of the machine they form a part of. The V-belt in the present invention can be expected to last at least as long as the V-belt which drives the fan of the cooling system of an automobile and anyone qualified to replace such a belt on an automobile can maintain and service the mechanical variable-speed mechanism of this present invention.

It is another object of the present invention to provide a variable-rate electrode feed apparatus, utilizing as the prime mover, in place of a special wound high-priced variable-speed electric motor, an ordinary low cost constant-speed motor such as is used for powering domestic home appliances, small shop tools, etc.

It is an additional specific object of this invention to provide an electrode feeding machine in which the rate of electrode feed is adjustable over a range which can be as low as 2:1 or as high as 20 to 1 and in which the rate of electrode speed at any setting within the speed range is positive and non-varying, so that a dial provided on the machine can be calibrated in inches of electrode fed to the welding arc per minute. With the present invention, this object is obtained by providing a positive and a continuous mechanical train of power extending between an electric motor, which rotates at a fixed constant speed, and the traction feed rolls, which feed electrode to the welding arc. The positive and continuous mechanical train of power includes at least one pair of variable-pitch diameter V-belt pulleys connected by a V-belt and an adjusting means for varying the pitch diameters of the variable-pitch diameter V-belt pulleys at which the V-belt rides in relation to each other.

Still another specific object of this invention is to provide an electrode feeding machine which feeds all conventionally used sizes and types of coiled and spooled continuous lengths of electrode at whatever rate of speed the different sizes and types of electrode should be fed to produce quality welding results, yet is small enough and sufficiently light in weight to be suitably portable. The present invention provides this required portability primarily in two ways, namely, (1) by unitizing or by combining the mechanical speed control arrangement with other portions of the power train as a whole so that shafts and their bearings, which support reduction gears and the like, serve a dual purpose and (2) provide a mechanical means for varying the rate of electrode speed so that the power source can be a common constant-speed motor so as to benefit by the constant non-varying torque of a constant-speed motor. It is significant that when the electrode feeding rate is reduced to feed the larger sizes of electrode, which is common practice, the speed of the feed motor in the present invention is not reduced as is the case with conventional type machines. Rather, with this invention, the r.p.m. of the feed motor remains fixed at its rated r.p.m., and, to reduce the rotating speed of the feed rolls, the pitch diameter of the driving variable pitch V-belt pulley is reduced and the pitch diameter of the driven variable pitch V-belt pulley increased, which increases the torque at the feed rolls when feeding the larger sizes of electrode. The reverse to this is the case in conventional electrode feeding machines wherein the speed of the motor is varied to vary the rate of electrode feed. Hence, if the speed range is 8:1 and the speed of a 5,000 r.p.m. motor is reduced to ⅛ of 5,000 r.p.m., or to 625 r.p.m., the torque rating of the motor is generally drastically reduced at the lower end of the adjustable speed range where the torque requirement for feeding the larger sizes of electrode is the greatest. Hence, large size motors must be used for powering the conventional machines, whereas, in the present invention when the rotating speed of the feed rolls is reduced to feed the larger sizes of electrode, the torque at the feed rolls is increased rather than reduced and this allows the use of a much smaller frame size motor, which in turn provides greater portability because of less weight and smaller size, plus the added advantage of an electric motor which costs much less.

The nature of this invention and its objects and advantages will be better understood by reference to the specific description that follows and to the accompanying drawings in which:

FIGURE 1 is a top plan view of a preferred form of the electrode feed apparatus with the top plate broken away.

FIGURE 2 is a side view in elevation of the electrode feed apparatus shown in FIGURE 1 with the side plate broken away.

FIGURE 3 is a cross-sectional view of the electrode feed apparatus taken at 3—3 in FIGURE 1.

FIGURE 4 is an enlarged view in elevation illustrating the bearing arrangement for the power input pulley bias spring.

FIGURE 5 is a cross-sectional view of the pulley drive train taken at 5—5 of FIGURE 1.

FIGURE 6 is a top plan view of the pulley drive train set for a reduced electrode feed rate.

FIGURE 7 is a cross-sectional view of the pulley drive train taken at 7—7 in FIGURE 6.

FIGURE 8 is a top plan view of the pulley drive train set for an increased electrode feed rate.

FIGURE 9 is a cross-sectional view taken at 9—9 in FIGURE 8.

Referring now to FIGURES 1, 2, and 3, there is shown a preferred form of the electrode feed apparatus wherein all of the essential components are combined into one assembly to have one common base for all of the components, and the machine assembly is contained in a cabinet 13. The wire electrode 14 is engaged between the traction feed rolls 11 and 12 and withdrawn by rotation of the feed rolls from a spool or reel 15 which in practice may be separately mounted some distance from the cabinet 13 or may be mounted on an arm or flange (not shown) secured to the cabinet 13. The traction feed rolls 11 and 12 serve to push the wire electrode 14 through a conduit 16, generally a flexible conduit, to the welding arc at which point deposition of the electrode metal occurs along a manually or mechanically directed course. The feed rolls 11 and 12, in turn, are powered by a variable-speed drive which comprises briefly a constant-speed electric motor 17, a first speed reducing gear train 18, an adjustable variable-speed pulley drive train 19, and a second speed reducing gear train 21.

The constant-speed electric motor 17 is of the type having an effective characteristic of a substantially constant speed regardless of variation in torque load, preferably a conventional split phase AC induction type motor. It will be apparent that other types of constant-speed electric motors, notably synchronous AC motors, may also be used as the prime mover of the electrode feed apparatus. The split phase induction motor is preferred because it provides the requisite constant-speed characteristic at minimum cost and size. The motor 17 is preferably provided with a conventional thermo-switch (not shown) to disconnect the motor from the power line should the motor for some unusual reason become overloaded. In the electrode feed apparatus, the constant-speed motor 17 is rigidly affixed to the lubricant tight housing 28, which contains the speed reducing gears and which acts as the base for the machine as a whole.

The speed reducing gear train 18 comprises a spur gear 23 driving a larger pitch diameter spur gear 24. The spur gear 23 is affixed to the drive shaft of the constant-speed motor 17, and the spur gear 24 is affixed on a shaft 25 which is mounted for rotation on a fixed axis in bearings 26 and 27 secured in housing 28. The housing 28 is rigidly affixed to cabinet 13 by bolts or other conventional fastening means.

FIGURES 1, 2, and 3 clearly show the transmission of power from the constant-speed electric motor 17 to the feed rolls 11 and 12 via a continuous, uninterrupted, mechanical transmission train from the constant-speed electric motor 17 to the feed rolls 11 and 12, with the constant speed of motor 17 converted into variable-speed at the feed rolls 11 and 12 by an adjustable pulley drive train 19 comprising a pair of variable-pitch V-groove pulleys 31 and 32, operatively interconnected by a conventional V-belt 30. It is also clearly shown in FIGURES 1, 2, and 3 that the mechanical principle used for converting the constant-speed of the motor 17 into an adjustable variable-speed at the feed rolls 11 and 12 is provided simply and economically and at a very low cost, by extending two shafts, 25 and 49, through the side wall of housing 28, thus minimizing the number of parts which make up the machine by providing that certain parts render dual purposes, which allows for smaller overall size, lighter weight, and low cost.

The power input or driving pulley 31 consists of a pair of side members 34 and 35 having opposed conical flanges 36 and 37 integral respectively with sleeves 38 and 39. The side member 34 is affixed to the forward end of the shaft 25 by a pin 41 passed through the sleeve 38 and the shaft 25 or by other conventional fastening means. The side member 35, on the other hand, is keyed to a longitudinal keyway 30 in the shaft 25, as shown in FIGURE 1, so as to enjoy limited travel axially of the shaft 25. Disposed about the sleeve 39 and between the flange 37 and the washer 40 is a compression spring 42 which exerts a continual force urging the side member 35 toward the side member 34 and, hence, tending to increase the effective diameter of the pulley 31 with respect to the V-belt 30. In short, the pulley 31 is a spring-operated variable-pitch V-belt pulley biased toward a condition of maximum pitch diameter.

In FIGURE 4 there is shown a preferred bearing arrangement for the bias spring 42. This consists of a washer 40 against which the spring 42 bears. The washer 40, in turn, bears against a spring clip 50 which snaps into an annular groove in the shaft 25 so that the force of the spring does not bear on the housing 28 or on the bearing 27. Such a spring clip is also used adjacent the bearing 26 to prevent forward travel of the shaft 25. With the arrangement described, the spring 42 rotates with the shaft 25, and frictional drag between the pulley 31 and the housing 28 is eliminated.

Referring again to FIGURES 1, 2, and 3, it is seen that the variable-pitch power output or driven pulley 32 similarly consists of a pair of side members 43 and 44 having opposed conical flanges 45 and 46 integral respectively with sleeves 47 and 48. The side member 43 is keyed to a keyway 60 in the forward end of a shaft 49 so as to enjoy limited travel axially of the shaft 49 which is mounted for rotation on a fixed axis parallel to the axis of rotation of the shaft 25. Specifically, the shaft 49 is mounted in bearings 51 and 52 secured in the housing 28 and is preferably positioned and lateral movement is prevented by spring clips (not shown) of the type previously described. The side member 44 of the pulley 32 is disposed between the side member 43 and the housing 28 and secured to the shaft 49 by a pin 53 passed through the sleeve 48 and the shaft 49 or by other conventional fastening means.

In order to enable selective manual adjustment of the pitch diameter of the driven pulley 32, one race of a thrust bearing 54 is affixed to the forward end of the side member sleeve 47 co-axially with the sleeve 47. A disc 55 is affixed to the opposite race of the bearing 54. The outer face of disc 55 is preferably provided with a central indent to receive the rounded end of a threaded shaft 56 which extends into the cabinet 13 and through a compatibly-threaded member 57 affixed to the front plate of the cabinet 13. A knurled feed rate knob 58 is affixed to the outer end of the shaft 56, and pointer 59 is keyed to the shaft 56. In short, the pulley 32 is a manually-adjustable variable-pitch V-belt pulley. As will be described with more particularity further on, rotation of the knob 58 results in a relative adjustment of the pitch diameters of both pulleys 31 and 32.

In order to transmit power from the driven pulley 32 to the feed rolls 11 and 12, the shaft 49 is provided with a second speed reducing gear train 21 consisting of a worm 61 driving a worm gear 62 which is affixed to the feed roll 11 shaft 63. As best shown in FIGURE 3, the shaft 63, in turn, is rotatably mounted in a bearing assembly 64 secured in a portion of the frame 28. The shaft 63 is further provided with a spur gear 65 which drives a spur gear 66 of equal pitch diameter affixed to the shaft 67 of feed roll 12 in order to drive the feed roll 12.

It will be noted that the shaft 67 of the feed roll 12 is rotatably mounted in a bearing assembly 68 hinged about a pin 69 as best shown in FIGURE 2. A bias spring 71 disposed between a portion of the housing 28 and the bearing assembly 68 tends to urge the feed roll 12 out of driving engagement with the electrode 14. An opposing solenoid 72, shown somewhat diagrammatically, serves when actuated to force the feed roll 12 into driving engagement with the electrode 14. This hinged arrangement of the feed roll 12 is not a necessary part of the present invention but it is preferred because it enables electrode feed to be selectively stopped or started with the drive motor 17 running continuously. This principle and its unique advantages are fully described in Patent No. 2,931,890 issued to Arthur A. Bernard on April 5, 1960.

Conventional guide means (not shown) can be used to guide the electrode 14 into and out of the feed rolls 11 and 12. However, it is preferable to employ the guide means which is described, together with its unique advantages, in the co-pending patent application Ser. No. 380,745 now U.S. Patent No. 3,279,669, filed July 7, 1964, by the present two inventors.

It is a unique advantage of the electrode feed apparatus described above that the electrode feed rate can be varied with precision and reliability over a broad stepless range without the necessity of varying the speed of the drive motor. This is made possible by employing a pulley drive train with at least one variable pitch diameter pulley in combination with means for maintaining drive tension in the pulley belt and means for selectively varying the pitch diameter of the variable pitch pulley. In the preferred embodiment described above, the spring 42 serves to maintain drive tension in the V-belt 30 by biasing the driving pulley 31 toward a condition of maximum pitch diameter. The V-belt tension, in turn, urges the driven pulley 32 toward a condition of minimum pitch diameter. Consequently, by rotating threaded shaft 56 via the knob 58, the position of the driven pulley side member 43 and, accordingly, the pitch diameter of the pulley 32 can be selectively varied. The accuracy and reliability of this method of electrode feed rate control is such that the electrode feed apparatus can be equipped with a dial plate 22 calibrated in inches per minute. Once the operator has determined the optimum feed rate for a particular brand and size of electrode, he is able to quickly dial the proper feed rate each time this particular brand and size of electrode is used, thereby eliminating the need for repeated experiment.

As mentioned previously, to handle the full range of electrode sizes now in general use, and in the different types such as solid wire, tubular flux-cored type and others, an electrode feeding machine should have an adjustable range of electrode speed from 75 inches per minute to 450 inches per minute, which necessitates a speed variation ratio of at least 6 to 1. In the machine shown in FIGURES 1, 2 and 3 the electric motor 17 which powers the feed rolls 11 and 12 rotates at a constant speed of 1750 r.p.m. Spur gears 23 and 24 have a step down speed ratio of 2 to 1; therefore, the shaft 25, to which variable-pitch diameter belt pulley is keyed, rotates at a constant speed of 875 r.p.m. In FIGURES 1 and 2, the pulley drive train 19 is depicted as set for median electrode feed rate. This is more clearly illustrated by the cross-sectional view of FIGURE 5. At this setting the pulleys 31 and 32 are at their effective median pitch diameters which preferably are equal so that the speed of the driven pulley 32 will be equal to the constant rotation speed of driving pulley 31, which, as mentioned above, is 875 r.p.m. The second train of speed reduction gears consisting of worm 61 and worm gear 62 has a speed reduction ratio to 30 to 1; therefore, the shaft 63 to which worm gear 62 is keyed rotates at a speed of $\frac{1}{30}$ of 875 r.p.m. or, at about 29 r.p.m. The feed rolls 11 and 12 are about 2 inches in diameter, which amount to about 6¼ inches in circumference; therefore, when pulley drive train 19 is adjusted to provide median electrode feed rate this rate is 29 r.p.m. times 6¼ inches, which amounts to about 181.25 inches of electrode feed to the welding arc per minute.

In FIGURES 6 and 7, the pulley drive train 19 is depicted as set for feeding electrode at the lower end of the electrode feed rate range. This setting is obtained by rotating the feed rate control knob 58 so as to force the side member 43 of the driven pulley 32 inwardly, thereby increasing its pitch diameter. The side member 35 of the driving pulley 31 is correspondingly moved against the force of the bias spring 42 by the V-belt 30, causing the pitch diameter of the driving pulley 31 to decrease to a magnitude less than its median magnitude. Accordingly, the speed of the driven pulley 32 is reduced to less than the constant speed of the driving pulley 31.

In actual practice, the minimum pitch diameters of both the driving pulley 31 and the driven pulley 32 is 1½ inches and the maximum pitch diameter of both of these two pulleys is 3⅜ inches; therefore, when the pulley drive train 19 is set as depicted by FIGURES 6 and 7, the V-belt rides the 1⅛ inch pitch diameter of pulley 31 and the 3⅜ inch pitch diameter of pulley 32 which drives shaft 49 at a speed of ⅓ the 875 r.p.m. speed of constant speed shaft 31, or, at about 292 r.p.m., which in turn is reduced to about 10 r.p.m. by speed reduction gears 61 and 62 to produce an electrode feed rate of about 60.4 inches per minute at the lower end of the feeding speed range.

In FIGURES 8 and 9, the pulley drive train 19 is depicted as set for feeding electrode at the higher end of the electrode feed rate range. This setting is obtained by rotating the feed rate control knob 58 in the opposite direction so as to permit the tension imparted to the V-belt by the bias spring 42 to decrease the pitch diameter of the driven pulley 32, enabling the pitch diameter of the driving pulley 31 to increase to a magnitude greater than its median magnitude. In actual practice, this adjustment forces the V-belt 30 to drop down to the 1⅛ inch pitch diameter of constant-speed pulley 31 and increase out to the 3⅜ inch pitch diameter of variable speed pulley 32 which thereby rotates shaft 49 at a speed equal to three times the 875 r.p.m. constant speed of shaft 25, or, at a speed of about 2,625 r.p.m., which is reduced to a speed of about 87.5 r.p.m. by speed reduction gears 61 and 62, thus rotating the feed rolls 11 and 12 at a speed of 87.5 r.p.m to produce an electrode feed rate of about 546.8 inches per minute.

Therefore, it is seen that the electrode feed rate can be varied through a broad stepless range from a minimum of about 60.4 inches per minute to a maximum of about 546.8 inches per minute, and which is a variable-speed ratio of about 9:1. It should be noted that variation of the pitch diameters of the pulleys 31 and 32 from the high end of the electrode feed rate range to the low end of the electrode feed rate is attended by a 9:1 increase in torque transmission to the feed rolls 11 and 12. Since the low end of the feed rate range is normally used for feeding large diameter electrode which imposes a larger torque load on the electrode feeding machine, the increase in torque at the low end of the electrode feed rate range provided by the variable pulley drive 19 is a distinct advantage.

Although the electrode feed rate range of 60.4 to 546.8 inches per minute covers the requirements for all arc welding procedures now in general use, new developments in electrode design and improved welding procedures may enable higher welding speeds necessitating higher feed rates of electrode feed. The present electrode feed apparatus is adapted to readily accommodate such higher rates by reducing the reduction ratio of the gear train 18. For example, to adapt the apparatus to feed electrode at a range from about 120 inches per minute to about 1100 inches per minute, the present spur gears 23 and 24 can be replaced by a pair of gears of equal pitch diameter, which would rotate shaft 25 and constant speed pulley 31 at the 1750 r.p.m. of the electric motor 17, or, to provide this same result the 1750 r.p.m. constant speed motor 17 can be replaced by a 3,500 r.p.m. motor.

It is apparent that the electrode feed apparatus could be utilized with all the speed reduction provided by either the gear train 18 alone or the gear train 21 alone. However, it is desirable to partially reduce the speed in front of the pulley drive train 19 in order to increase V-belt life, and to provide the remaining speed reduction following the pulley drive train 19 in order to lessen the torque required to be transmitted by the pulley drive train 19.

Although a certain specific embodiment of the invention has been illustrated and described, it is to be understood that this is merely by way of example and in no manner is to be construed as a limitation. It is contemplated that certain modifications may be made within the scope of the claims without departing from the spirit of the invention. For example, in some cases, it may be found desirable to employ a pulley drive train comprising more than two pulleys and/or more than one pulley belt. In other cases, it may be found desirable to utilize only one variable-pitch pulley with the means for maintaining drive tension comprising a spring-biased idler bearing against the pulley belt or comprising a spring-biased movable shaft for one of the pulleys to maintain tension in the pulley belt.

What is claimed is:

1. In an arc welding electrode feeding machine in which consumable wire electrode is withdrawn from a source and pushed through a conduit to the welding arc by at least one pair of traction feed rolls, the combination with said pair of traction feed rolls comprising: a constant speed electric motor; a first shaft mounted for rotation on a fixed axis; a spur gear train interconnecting said constant speed electric motor and one end of said first shaft for rotating said first shaft at a constant speed; a first, spring-operated variable-pitch-diameter V-belt pulley keyed to the opposite end of said first shaft; a second shaft mounted for rotation on a fixed axis; a second variable-pitch-diameter V-belt pulley keyed to one end of said second shaft; a V-belt interconnecting said first, spring-operated variable-pitch-diameter V-belt pulley and said second variable-pitch-diameter V-belt pulley; a worm gear train inter-connecting the opposite end of said second shaft and said pair of traction feed rolls for transmitting power from said second shaft to said pair of traction feed rolls; and adjustment means for manually selecting the pitch diameter of said second variable-pitch-diameter V-belt pulley.

2. In an arc welding electrode feeding machine in which consumable wire electrode is withdrawn from a source and pushed through a conduit to the welding arc by at least one pair of traction feed rolls, the combination with said pair of traction feed rolls comprising: a constant speed electric motor; a first shaft mounted for rotation on a fixed axis; means interconnecting one end of said first shaft and said constant speed electric motor for driving said first shaft at a constant speed; a spring-operated variable-pitch-diameter V-belt pulley keyed to the opposite end of said first shaft; a second shaft mounted for rotation on a fixed axis; a manually-adjustable variable-pitch-diameter V-belt pulley keyed to one end of said second shaft; a V-belt interconnecting said spring-operated variable-pitch-diameter V-belt pulley and said manually-adjustable variable-pitch-diameter V-belt pulley; and means interconnecting the opposite end of said second shaft to said pair of traction feed rolls for transmitting power from said second shaft to said pair of traction feed rolls.

3. In an arc welding electrode feeding machine in which consumable wire electrode is withdrawn from a source and pushed through a conduit to the welding arc by at least one pair of traction feed rolls, the combination with said pair of traction feed rolls comprising: a constant speed electric motor; a spring-operated variable-pitch-diameter V-belt pulley; a manually-adjustable variable-pitch-diameter V-belt pulley; a V-belt operatively interconnected between said spring-operated variable-pitch-diameter V-belt pulley and said manually-adjustable variable-pitch-diameter V-belt pulley; means interconnecting said constant speed electric motor and said spring-operated variable-pitch-diameter V-belt pulley for driving said spring-operated variable-pitch-diameter V-belt pulley at a constant speed; and speed reduction means for transmitting power from said manually-adjustable variable-pitch-diameter V-belt pulley to said pair of feed rolls.

4. In an arc welding electrode feeding machine in which consumable wire electrode is withdrawn from a source and pushed through a conduit to the welding arc by at least one pair of traction feeds rolls, at least one of said pair of traction feed rolls having a structurally fixed axis of rotation, the combination with said pair of traction feed rolls comprising: a pulley drive train comprising at least one pair of pulleys operatively interconnected by a pulley belt, at least one of said pair of pulleys having an axis of rotation which is structurally fixed with reference to the fixed axis of said one feed roll; speed reduction means interposed between said one fixed axis pulley and said one fixed axis feed roll for transmitting power from said pulley drive train to said feed rolls; means for selectively varying the pitch diameter of at least one of said pair of pulleys; means for maintaining drive tension in said pulley belt; a constant speed electric motor; and means for transmitting power from said constant speed electric motor to said pulley drive train.

5. In an arc welding electrode feeding machine in which consumable wire electrode is withdrawn from a source and pushed through a conduit to the welding arc by at least one pair of traction feed rolls, at least one of said pair of traction feed rolls having a structurally fixed axis of rotation, the combination with said pair of traction feed rolls comprising: a constant speed electric motor; a first pulley; means for transmitting power from said constant speed motor to said first pulley; a second pulley having an axis of rotation which is structurally fixed with reference to the fixed axis of said one feed roll; at least one pulley belt for transmitting power from said first pulley to said second pulley speed reduction gear train means interposed between said second pulley and said one fixed axis feed roll for transmitting power from said second pulley to said pair of feed rolls; means for mechanically varying the pitch diameter relationship of said first and second pulleys; and means for maintaining drive tension in said pulley belt.

6. In an arc welding electrode feeding machine in which consumable wire electrode is withdrawn from a source and pushed through a conduit to the welding arc by at least one pair of traction feed rolls, at least one of said pair of traction feed rolls having a structurally fixed axis of rotation, the combination with said pair of traction feed rolls comprising: a constant speed electric motor; a first variable-pitch-diameter pulley; means for transmitting power from said constant speed electric motor to said first pulley; a second variable-pitch-diameter pulley having an axis of rotation which is structurally fixed with reference to the fixed axis of said one feed roll; an endless pulley belt interconnecting said first and second pulleys for transmitting power from said first pulley to said second pulley; means interposed between said second pulley and said one fixed axis feed roll for transmitting power from said second pulley to said pair of traction feed rolls; means for selectively varying the pitch diameter of one of said first and second pulleys; and means biasing the other one of said first and second pulleys toward a condition of maximum pitch diameter so as to maintain drive tension in said pulley belt.

7. In an arc welding electrode feeding machine in which consumable wire electrode is withdrawn from a source and pushed through a conduit to the welding arc by at least one pair of traction feed rolls, the combination with said pair of traction feed rolls comprising: a constant speed electric motor; a first variable-pitch-diameter V-groove pulley; means for transmitting power from said constant speed electric motor to said first V-groove pulley; a second variable-pitch-diameter V-groove pulley; an endless V-belt interconnecting said first and second pulleys for transmitting power from said first pulley to said second pulley; means for transmitting power from said second pulley to said pair of feed rolls; an adjustable screw limiting axial spread of said second V-groove pulley so as to enable manual selection of the pitch diameter of said second V-groove pulley; and a bias spring resisting axial spread of said first V-groove pulley so as to maintain drive tension in said V-belt.

8. In an arc welding electrode feeding machine in which consumable wire electrode is withdrawn from a source and pushed through a conduit to the welding arc by at least one pair of traction feed rolls, the combination with said pair of traction feed rolls comprising: a constant speed electric motor; a first shaft mounted for rotation on a fixed axis; a gear train interconnecting said constant speed electric motor and one end of said first shaft so as to rotate said shaft at a constant speed; a first variable-pitch-diameter V-groove pulley keyed to the opposite end of said first shaft; a second shaft mounted for rotation on a fixed axis; a second variable-pitch-diameter V-groove pulley keyed to one end of said second shaft; an endless V-belt interconnecting said first and second variable-pitch-diameter V-groove pulleys; a gear train interconnecting the opposite end of said second shaft and said pair of traction feed rolls for transmitting power from said second shaft to said pair of traction feed rolls; an adjustable screw limiting axial spread of said second variable-pitch-diameter V-groove pulley so as to enable manual selection of the pitch diameter of said second V-groove pulley; and a compression spring resisting axial spread of said first V-groove pulley so as to maintain drive tension in said V-belt.

9. The combination defined in claim 8 wherein said feed rolls are driven at the median of their rotational speed range when the first V-groove pulley pitch diameter is equal to the second V-groove pulley pitch diameter.

10. In an arc welding electrode feeding machine in which consumable wire electrode is withdrawn from a source and pushed through a conduit to the welding arc by at least one pair of traction feed rolls, the combination with said pair of feed rolls comprising: a constant speed electric motor; a first shaft mounted for rotation on a fixed axis; a speed reducing spur gear train for transmitting power from said constant speed electric motor to said first shaft; a first V-groove pulley including a first side member fixed in position on said first shaft and a second side member keyed to said first shaft such that the pitch diameter of said first V-groove pulley is varied by axial movement of said second side member; a second shaft mounted for rotation on a fixed axis; a second V-groove pulley including a first side member fixed in position on said second shaft and a second side member keyed to said second shaft such that the pitch diameter of said second V-groove pulley is varied by axial movement of said second side member; an endless V-belt interconnecting said first and second V-groove pulleys for transmitting power from said first V-groove pulley to said second V-groove pulley; a speed reducing worm gear train for transmitting power from said second shaft to said pair of feed rolls; an adjustable screw limiting axial travel of said second side member of said second V-groove pulley away from said first side member of said second V-groove pulley so as to enable manual selection of the pitch diameter of said second V-groove pulley; and a bias spring urging said second side plate of said first V-groove pulley toward said first side plate of first V-groove pulley so as to maintain drive tension in said V-belt.

References Cited

UNITED STATES PATENTS

| | | | |
|---|---|---|---|
| 2,133,593 | 10/1938 | Tautz | 74—217 |
| 2,556,512 | 6/1951 | Ammon | 74—217 |
| 3,016,451 | 1/1962 | Cornell | 226—181 X |
| 3,239,120 | 3/1966 | Bosteels | 226—178 |

FOREIGN PATENTS 780,134  7/1957  Great Britain.

ALLEN N. KNOWLES, *Primary Examiner.*

M. HENSON WOOD, JR., *Examiner.*

UNITED STATES PATENT OFFICE

CERTIFICATE OF CORRECTION

Patent No. 3,356,274                              December 5, 1967

Arthur A. Bernard et al.

It is hereby certified that error appears in the above numbered patent requiring correction and that the said Letters Patent should read as corrected below.

Column 9, line 45, for "speed reduction gear train" read -- ; gear train speed reduction --; line 70, after "and", second occurrence, insert -- spring --.

Signed and sealed this 18th day of February 1969.

(SEAL)
Attest:

Edward M. Fletcher, Jr.                          EDWARD J. BRENNER

Attesting Officer                                    Commissioner of Patents